United States Patent
Kwon et al.

(10) Patent No.: US 9,609,382 B2
(45) Date of Patent: *Mar. 28, 2017

(54) APPARATUS AND METHOD FOR WIRELESS COMMUNICATIONS

(75) Inventors: Chang-yeul Kwon, Yongin-si (KR); Jae-min Lee, Suwon-si (KR); Guoping Fan, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2334 days.

This patent is subject to a terminal disclaimer.

(21) Appl. No.: 11/933,679

(22) Filed: Nov. 1, 2007

(65) Prior Publication Data
US 2008/0101459 A1 May 1, 2008

Related U.S. Application Data

(60) Provisional application No. 60/855,757, filed on Nov. 1, 2006.

(30) Foreign Application Priority Data

Aug. 3, 2007 (KR) .................. 10-2007-0078047

(51) Int. Cl.
| | |
|---|---|
| *H04N 21/4363* | (2011.01) |
| *H04N 21/63* | (2011.01) |
| *H04N 19/184* | (2014.01) |
| *H04N 19/67* | (2014.01) |
| *H04W 28/18* | (2009.01) |

(Continued)

(52) U.S. Cl.
CPC ..... *H04N 21/43637* (2013.01); *H04N 19/184* (2014.11); *H04N 19/67* (2014.11); *H04N 21/631* (2013.01); *H04W 28/18* (2013.01); *H04W 74/00* (2013.01); *H04W 88/06* (2013.01)

(58) Field of Classification Search
None
See application file for complete search history.

(56) References Cited

U.S. PATENT DOCUMENTS

| | | |
|---|---|---|
| 6,760,882 B1 | 7/2004 | Gesbert et al. |
| 6,970,437 B2 * | 11/2005 | Lott et al. ............ 370/318 |

(Continued)

FOREIGN PATENT DOCUMENTS

| | | |
|---|---|---|
| EP | 1594284 A2 | 11/2005 |
| JP | 2001-298480 A | 10/2001 |

(Continued)

OTHER PUBLICATIONS

"Robust Image Transmission with Bidirectional Synchronization and Hierarchical Error Correction", Hongzhi Li, IEEE Transactions on Circuit or Video Technology, vol. 11, No. 11, pp. 1183-1187, Nov. 2001.

(Continued)

Primary Examiner — Gregory Sefcheck
Assistant Examiner — Suk Jin Kang
(74) Attorney, Agent, or Firm — Sughrue Mion, PLLC

(57) ABSTRACT

An apparatus and method for wireless communications are provided. The apparatus for wireless communications includes a media access control processing unit providing a plurality of sub-packets, and a transmitting/receiving unit outputting a packet that includes the plurality of sub-packets using a plurality of transmission modes.

11 Claims, 10 Drawing Sheets

(51) Int. Cl.
*H04W 74/00* (2009.01)
*H04W 88/06* (2009.01)

(56) References Cited

U.S. PATENT DOCUMENTS

| | | | |
|---|---|---|---|
| 7,068,683 | B1 | 6/2006 | Lundby et al. |
| 7,885,214 | B2* | 2/2011 | Ahmadi et al. ............... 370/295 |
| 2003/0067991 | A1* | 4/2003 | Okamoto ...................... 375/262 |
| 2005/0117601 | A1* | 6/2005 | Anderson et al. ............ 370/465 |
| 2005/0135390 | A1* | 6/2005 | Anderson et al. ............ 370/401 |
| 2005/0216599 | A1 | 9/2005 | Anderson et al. |
| 2005/0271072 | A1* | 12/2005 | Anderson et al. ............ 370/419 |
| 2006/0034301 | A1* | 2/2006 | Anderson et al. ............ 370/401 |
| 2006/0034326 | A1* | 2/2006 | Anderson et al. ............ 370/466 |
| 2006/0126492 | A1* | 6/2006 | Hyun et al. ................... 370/208 |
| 2006/0126549 | A1* | 6/2006 | Bourlas et al. ............... 370/310 |
| 2007/0067809 | A1* | 3/2007 | Kwon et al. ..................... 725/80 |
| 2007/0177569 | A1* | 8/2007 | Lundby ......................... 370/349 |
| 2008/0037465 | A1* | 2/2008 | Ngo et al. ..................... 370/329 |
| 2008/0037466 | A1* | 2/2008 | Ngo et al. ..................... 370/329 |
| 2008/0056229 | A1* | 3/2008 | Gholmieh et al. ............ 370/349 |
| 2008/0130741 | A1* | 6/2008 | Chiang et al. ........... 375/240.01 |
| 2008/0192726 | A1* | 8/2008 | Mahesh et al. ............... 370/349 |
| 2008/0240031 | A1* | 10/2008 | Nassiri-Toussi et al. ..... 370/329 |
| 2009/0055709 | A1* | 2/2009 | Anderson et al. ............ 714/758 |
| 2009/0070479 | A1* | 3/2009 | Anderson et al. ............ 709/232 |
| 2009/0185532 | A1* | 7/2009 | Bourlas et al. ............... 370/329 |
| 2009/0241147 | A1* | 9/2009 | Kim et al. ....................... 725/62 |
| 2009/0268697 | A1* | 10/2009 | Jeon et al. ..................... 370/336 |
| 2009/0310514 | A1* | 12/2009 | Jeon et al. ..................... 370/254 |
| 2009/0323563 | A1* | 12/2009 | Ho .......................... H04B 7/061 370/280 |
| 2010/0074097 | A1* | 3/2010 | Jeon et al. ..................... 370/217 |
| 2010/0128626 | A1* | 5/2010 | Anderson et al. ............ 370/252 |
| 2010/0260055 | A1* | 10/2010 | Anderson et al. ............ 370/252 |
| 2011/0013681 | A1* | 1/2011 | Zou et al. ..................... 375/222 |
| 2011/0022719 | A1* | 1/2011 | Anderson et al. ............ 709/231 |
| 2013/0064097 | A1* | 3/2013 | Arviv et al. .................. 370/241 |

FOREIGN PATENT DOCUMENTS

| | | |
|---|---|---|
| JP | 04024988 B2 | 10/2007 |
| KR | 10-2007-0026471 A | 3/2007 |
| KR | 10-2007-0111296 A | 11/2007 |

OTHER PUBLICATIONS

First Office Action dated Mar. 30, 2010 issued by the State Intellectual Property Office of P.R. China in counterpart Chinese Application No. 200710167074.4.

Office Action dated Jun. 15, 2011 from the State Intellectual Property Office of P.R. China in counterpart Chinese application No. 200710167074.4.

"IEEE Standard for Information Technology—Telecommunications and Information Exchange Between Systems—Local and Metropolitan Area Networks—Specific Requirements Part 15.3: Wireless Medium Access Control (MAC) and Physical Layer (PHY) Specifications for High Rate Wireless Personal Area Networks", IEEE Standard ISBN: 978-0-7381-3704-9, Sep. 29, 2003, pp. 1-315, Piscataway, NJ, USA, XP017603623.

Vinod Kumar Malamal Vadakital et al, "Method for Unequal Error Protection in DVB-H for Mobile Television", IEEE 17th Inter National Symposium on Personal, Indoor and Mobile Radio Communications, Sep. 1, 2006, pp. 1-5, XP031023392.

"Digital Video Broadcasting (DVB); DVB specification for data broadcasting; ETSI EN 301 192", Nov. 1, 2004, pp . 1-78, vol. BC No. V1.4.1, Sophia Antipolis Cedex, France, XP014026918.

Communication dated Aug. 27, 2014 issued by European Patent Office in counterpart European Application No. 07833595.7.

\* cited by examiner

APPARATUS AND METHOD FOR WIRELESS COMMUNICATIONS

CROSS-REFERENCE TO RELATED APPLICATION

This application claims priority from U.S. Provisional Application No. 60/855,757, filed on Nov. 1, 2006 in the US Patent Trademark Office and Korean Patent Application No. 10-2007-0078047, filed on Aug. 3, 2007 in the Korean Intellectual Property Office, the disclosure of which is incorporated herein in its entirety by reference.

BACKGROUND OF THE INVENTION

1. Field of the Invention

Methods and apparatuses consistent with the present invention relate to wireless communications, and more particularly, to wireless communications that support a high-rate data transmission.

2. Description of the Related Art

The demand for the transmission of mass multimedia data in a wireless network has increased, and there is a greater need for research which would result in an effective transmission method in a wireless network environment. Additionally, the need for the wireless transmission of high-quality video, such as a digital video disk (DVD) video, a high definition television (HDTV) video, or the like, among various home devices, has increased.

Presently, an IEEE 802.15.3c task group is considering a technical standard for transmitting mass data in a wireless home network. This standard, called Millimeter Wave (mm-Wave), uses an electric wave having a physical wavelength of several millimeters to transmit of the mass data (that is, an electric wave having a frequency of 30 GHz to 300 GHz). In the related art, this frequency band is an unlicensed band and has limited use, for example, in communication carriers, radio astronomy, or vehicle anti-collision.

In the IEEE 802.11b standard or the IEEE 802.11g standard, a carrier frequency is 2.4 GHz, and a channel bandwidth is about 20 MHz. Further, in the IEEE 802.1a standard or the IEEE 802.11n standard, a carrier frequency is 5 GHz, and a channel bandwidth is about 20 MHz. In contrast, in the mmWave, a carrier frequency of 60 GHz is used, and a channel bandwidth is about 0.5 to 2.5 GHz. Accordingly, it can be seen that the mmWave uses a larger carrier frequency and channel bandwidth than the existing IEEE 802.11 standards. Accordingly, if a high-frequency signal having a wavelength in millimeters (Millimeter Wave) is used, a high transmission rate of several Gbps can be obtained, and the size of an antenna can be set to be not more than 1.5 mm. A single chip including the antenna can then be implemented.

In recent years, the transmission of uncompressed audio and/or video (A/V) data between wireless apparatuses using a high bandwidth of the millimeter wave has been studied. Compressed A/V data is compressed with a partial loss through processes, such as motion compensation, discrete cosine transform (DCT) conversion, quantization, variable length coding, and the like, such that portions insensitive to the sense of sight or the sense of hearing of a human being are eliminated. Accordingly, in the case of the compressed A/V data, deterioration in image quality due to a compression loss may occur. Further, A/V data compression and decompression of the transmitting device and the receiving device should follow the same standard. In contrast, uncompressed A/V data includes digital values (for example, R, G, and B components) representing pixel components as they are. Accordingly, in the case of uncompressed A/V data, vivid image quality can be provided.

As described above, since a large amount of data is transmitted in the high frequency wireless communication band, it is important to reduce the waste of wireless resources. Accordingly, there is a need for a technique that supports a high-rate data transmission more efficiently in the high frequency wireless communication band.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for wireless communications that support a high-rate data transmission.

According to as aspect of the present invention, there is provided a method for wireless communications, according to the present invention, which includes generating a packet that includes a plurality of sub-packets, and outputting the packet using a plurality of transmission modes.

According to another aspect of the present invention, there is provided an apparatus for wireless communications, which includes a media access control (MAC) processing unit providing a plurality of sub-packets; and a transmitting/receiving unit outputting a packet that includes the plurality of sub-packets using a plurality of transmission modes.

As described above, the apparatus and method for wireless communications according to the present invention can increase the data transmission efficiency.

BRIEF DESCRIPTION OF THE DRAWINGS

The above and other aspects of the present invention will be more apparent from the following detailed description taken in conjunction with the accompanying drawings, in which.

DETAILED DESCRIPTION OF EXEMPLARY EMBODIMENTS OF THE INVENTION

Figure 1:
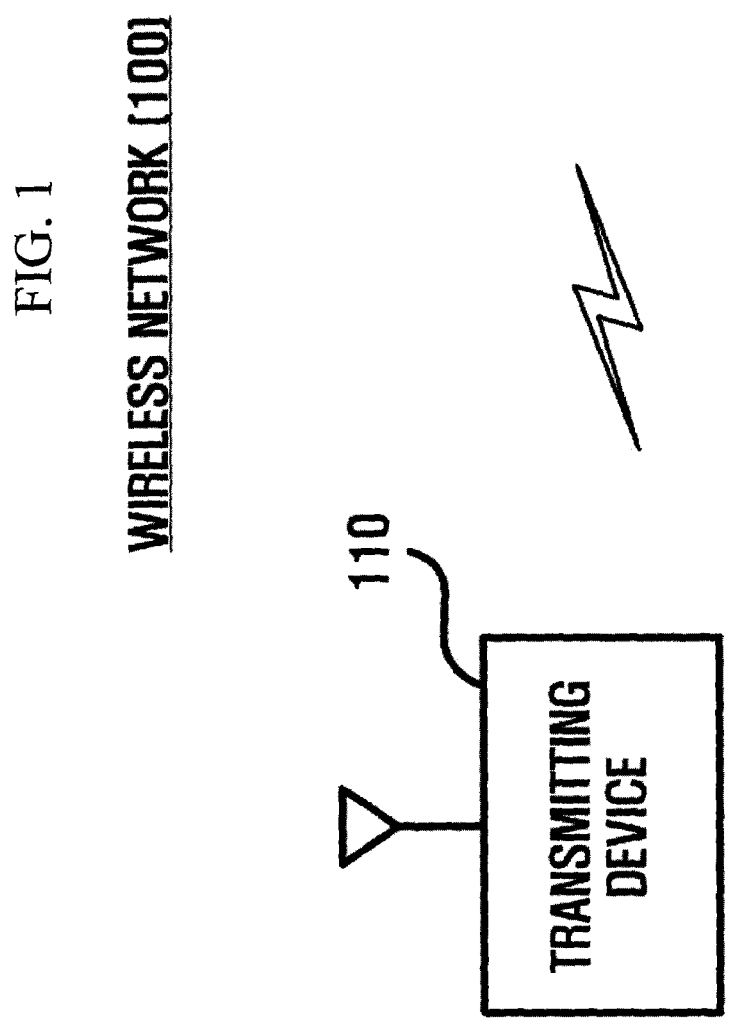
FIG. 1 is a view illustrating a wireless network according to an exemplary embodiment of the present invention.

Hereinafter, exemplary embodiments of the present invention will be described in detail with reference to the accompanying drawings. The aspects of the present invention and methods for achieving the aspects will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

FIG. 1 is a view illustrating a wireless network 100 according to an exemplary embodiment of the present invention. The wireless network 100 may be a wireless video area network (WVAN) that can support various applications for fast transmission of A/V data. The A/V data to be transmitted through the WVAN may be compressed or uncompressed. For example, the A/V data includes uncompressed 1080p A/V, uncompressed 1080i A/V, MPEG-2 compressed 1080p A/V, uncompressed 5.1 surround sound audio, and the like.

The wireless network 100 includes a transmitting device 110 and a receiving device 120. Although FIG. 1 illustrates the wireless network 100 composed of the transmitting device 110 and the receiving device 120, the present invention is not limited thereto. The wireless network 100 may include plural transmitting devices and receiving devices.

The transmitting device 110 and the receiving device 120 are wireless communication devices that can transmit/receive data using wireless media. More specifically, the transmitting device 110 may be a source device such as a set top box, a Blu-ray Disc (BD) player, a BD recorder, an High Definition Digital Versatile Disc (HD-DVD) player, an HD-DVD recorder, a Personal Video Recorder (PVR), an HD broadcasting receiver, or the like. The receiving device 120 may be a sink device such as a flat panel display, which includes an Liquid Crystal Display (LCD), a plasma device, and a Digital Lighting Processing (DLP) device, a BD recorder, an HD-DVD recorder, a PVR, or the like. Of course, the present invention is not limited thereto, and the transmitting device 110 and the receiving device 120 may be implemented by devices of different types.

The devices 110 and 120 of the wireless network 100 can support two kinds of physical layers (PHY), that is, a high-rate PHY (HRP) and a low-rate PHY (LRP). In the wireless network 100, a device that can support the LRP only may exist depending on its physical performance. Additionally, a device that supports the HRP but can perform one of data transmission and data reception using the HRP may exist in the wireless network 100.

The HRP can be used for a high-rate transmission of data (e.g., uncompressed A/V data). Preferably, the HRP can support an output of several Gbps. The HRP, in order to adjust an output direction or receiving direction of a wireless signal, can use an adaptive antenna technology, and in this case, the wireless signal output from the HRP has directionality. Accordingly, the HRP can be used for unicast. Since the HRP can be used for a high-rate transmission, it is preferable that the HRP is used to transmit isochronous data such as uncompressed A/V data. However, the exemplary embodiment of the present invention is not limited thereto, and the HRP can be used to transmit asynchronous data, MAC command, antenna steering information, and upper-layer control data for A/V devices.

The LRP can be used for a low-rate transmission of data. For example, the LRP can provide a bidirectional link of several Mbps. Since a wireless signal output from the LRP is nearly omni-directional, the LRP can be used for broadcast in addition to the unicast. The LRP can be used to transmit a MAC command that includes low-rate isochronous data such as audio, low-rate asynchronous data, a MAC command including beacons, an acknowledgement of an HRP packet, antenna steering information, capabilities information, and upper-layer control data for A/V devices.

In one exemplary embodiment of the present invention, the HRP can operate in diverse transmission modes (hereinafter referred to as "HRP modes") that support different signal processing methods. Among the HRP modes, at least one of a coding mode, a modulation method, and a data transmission rate may differ. In one exemplary embodiment of the present invention, the coding mode includes an equal error protection (EEP) mode and an unequal error protection (UEP) mode. The EEP mode is a coding mode in which the same coding rate is applied to respective bits of data to be transmitted, and the UEP mode is a coding mode in which two or more coding rates are applied to different bits of data to be transmitted.

Figure 2:
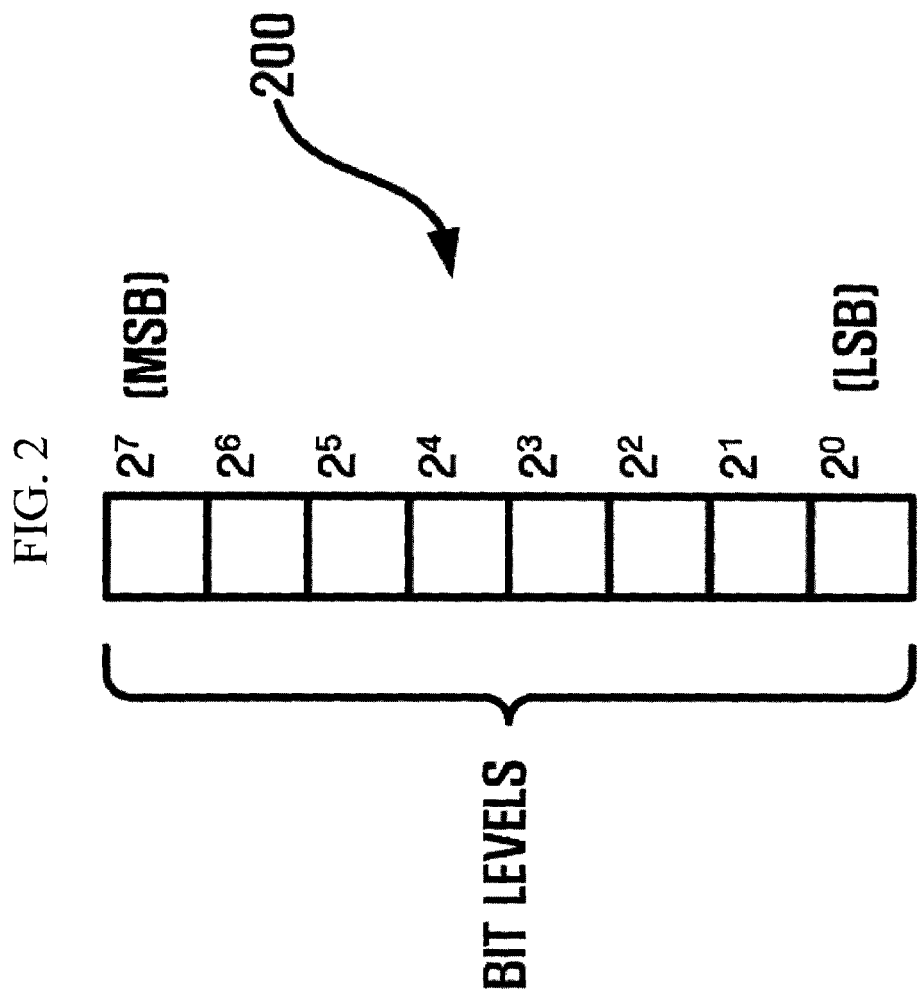
FIG. 2 is a view showing bit levels according to an exemplary embodiment of the present invention.

For example, in case of an eight-bit video image, as shown in FIG. 2, one sub-pixel component 200 is composed of eight bits. Among them, the bit that expresses the highest degree (i.e., the bit of the uppermost level) is the most significant bit (MSB), and the bit that expresses the lowest degree (i.e., the bit of the lowermost level) is the least significant bit (LSB). That is, the respective bits of one-byte (i.e., eight-bit) data have different significance levels in restoring the image signal. If an error occurs in a bit having a high significance level, a complete restoration of the image signal becomes more difficult than a case that an error occurs in a bit having a low significance level. Accordingly, in order to heighten the error correction effect, it is preferable to apply a lower code rate to the bits having the high significance levels than the bits having the low significance levels. For this, the UEP mode can be used.

HRP modes according to an exemplary embodiment of the present invention are shown in Table 1 as below.

TABLE 1

| HRP Mode Index | Encoding Mode | Modulation Method | Coding Rate Upper Bit Level [7] [6] [5] [4] | Coding Rate Lower Bit Level [3] [2] [1] [0] | Transmission Rate of Original Data (Gb/s) |
|---|---|---|---|---|---|
| 0 | EEP | QPSK | 1/3 | | 0.97 |
| 1 | | QPSK | 2/3 | | 1.94 |
| 2 | | 16-QAM | 2/3 | | 3.88 |
| 3 | UEP | QPSK | 4/7 | 4/5 | 1.94 |
| 4 | | 16-QAM | 4/7 | 4/5 | 3.88 |
| 5 | Retransmission | QPSK | 1/3 | infinite | 0.97 |
| 6 | | 16-QAM | 1/3 | infinite | 1.94 |

In Table 1, an HRP mode index is an identifier for identifying a respective HRP mode. In Table 1, if the HRP mode index is in the range of "0" to "2", the EEP mode is used, while if the HRP mode index is in the range of "3" to "4", the UEP mode is used. In case of the UEP mode, a coding rate of 4/7 is applied to the upper bit levels, while a coding rate of 4/5 is applied to the lower bit levels. In other words, a relatively low coding rate may be applied to the upper bit levels than the lower bit levels. In this case, the error correction effect for the upper bit levels becomes higher than the error correction effect for the lower bit levels.

In addition, HRP mode indexes 5 and 6 are HRP modes that can be used when a transmission error occurs and data is retransmitted. According to Table 1, during the retransmission of the data, a coding rate of 1/3 may be applied to the upper bit levels having a relatively high significance, and the lower bit levels having a relatively low significance may not be transmitted (i.e., the coding rate may be infinite). In the exemplary embodiment of the present invention, it is also possible that another HRP mode that includes the UEP mode or the EEP mode is used during the retransmission of the data.

As shown in Table 1, the modulation method such as Quadrature Phase Shift Keying (QPSK), 16-Quadrature Amplitude Modulation (QAM), or the like may differ according to the respective HRP mode. Also, the data transmission rate may differ according to the HRP mode.

The HRP modes as shown in Table 1 are merely exemplary, and thus the present invention is not limited thereto. Accordingly, HRP modes which are composed of diverse combination of coding modes, coding rates used in the respective coding modes, and modulation methods, may further exist. The HRP mode table as shown in Table 1 is shared by the respective devices in the wireless network 100. For example, the HRP mode table can be stored in the devices when the devices are manufactured, or can be inputted to the devices through a specified communication root after the devices are manufactured. In a manner similar to the HRP, the LRP can use diverse LRP modes.

Figure 3:
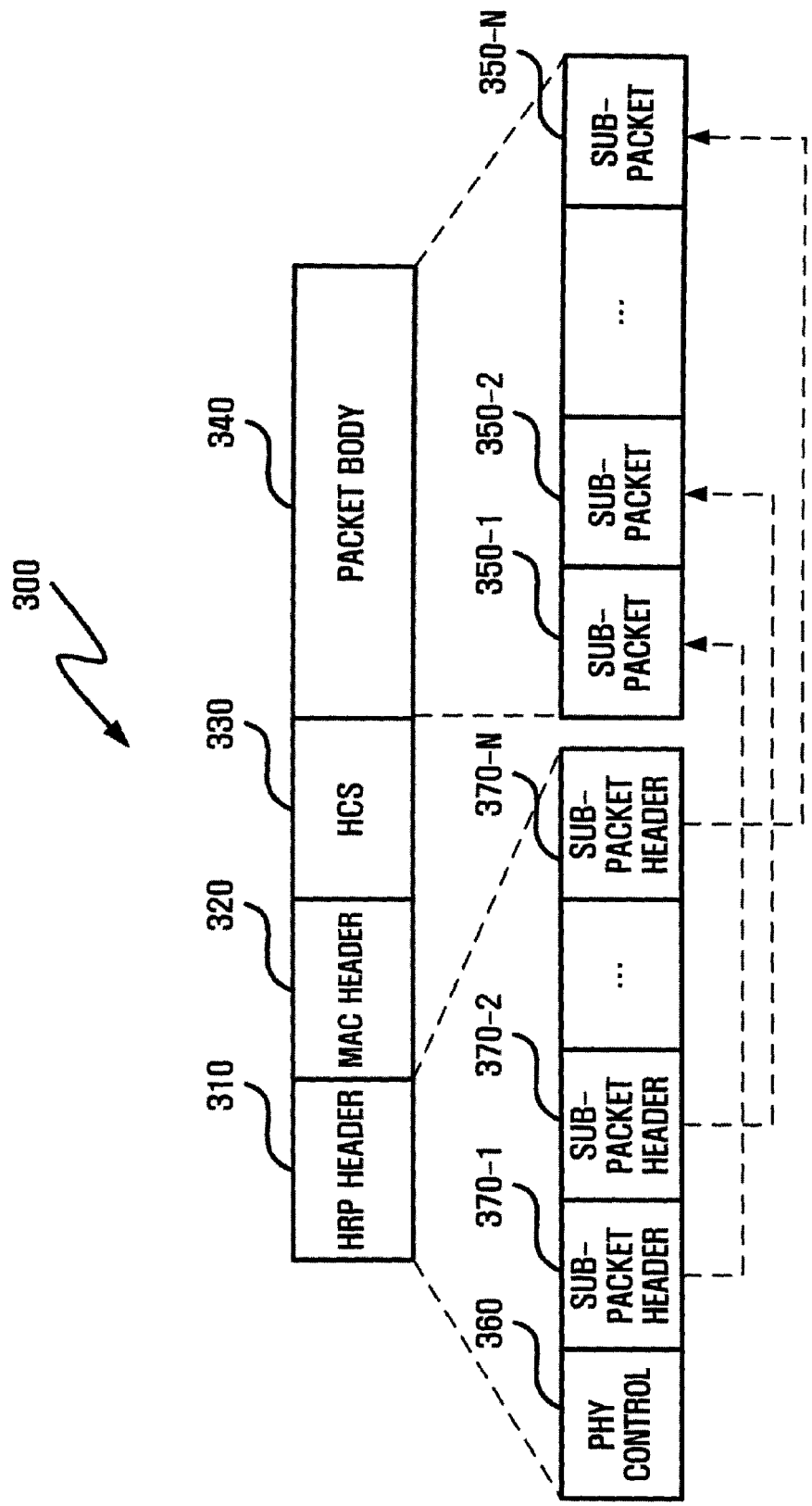
FIG. 3 is a view showing a packet according to an exemplary embodiment of the present invention.

FIG. 3 is a view showing an HRP protocol data unit (HRPPDU) packet 300 (hereinafter simply referred to as "HRP packet") that can be transmitted by a transmitting device 110 using the HRP according to an exemplary embodiment of the present invention.

The HRP packet includes an HRP header 310, a MAC header 320, an Header Check Sum (HCS) field 330, and a packet body 340. Although not illustrated in the figure, the HRP packet 300 may further include a preamble which can be used when a receiving device 120 that receives the HRP packet 300 performs an automatic gain control, phase estimation, and channel estimation, and a beam tracking field which can be used when the receiving device performs a beam tracking work.

The packet body 340 includes one or more sub-packets 350-1, 350-2, . . . , and 350-N, which have the same size. It is preferable that the packet body 340 has 7 sub-packets. However, this is exemplary, and the number of sub-packets included in the packet body 340 is not limited to 7.

Figure 4:
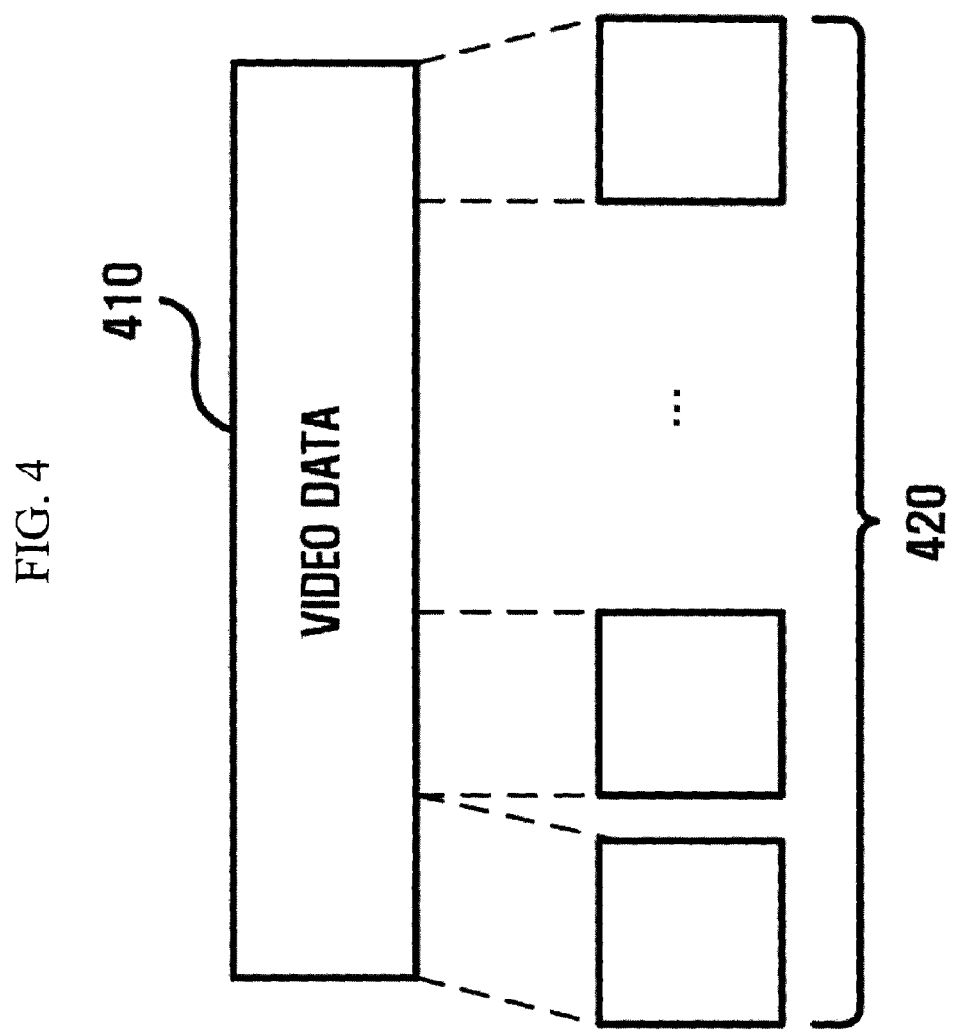
FIG. 4 is a view showing data in a divided state according to an exemplary embodiment of the present invention.

The transmitting device 110 divides the data to be transmitted into predetermined sizes in advance, and in this case, the divided pieces of data are included in the sub-packets. For example, as shown in FIG. 4, the transmitting device 110 divides video data 410 into several data pieces 420, and generates a plurality of sub-packets that include the data pieces. If the size of the data to be transmitted is equal to or smaller than the size of the sub-packet set in advance, the corresponding data can be included in the sub-packet without being divided.

In addition to the video data, audio data, A/V control data, and other additional data (e.g., caption data) are also composed of sub-pixels. Here, the A/V control data is data required when the A/V data are normally transmitted and processed between the source device and the sink device, and may be a message for requesting connection/disconnection of A/V stream connection, a message for controlling reproduction of the A/V data, and information about a device (e.g., device name, device type, and the like).

Referring again to FIG. 3, the MAC header 320 includes an address of the transmitting device 110 that transmits the HRP packet 300, an address of the receiving device 120 that receives the HRP packet 300, and the like.

The HCS field 330 includes HCS information of the HRP header 310 and the MAC header 320.

The HRP header 310 includes information required when the receiving device 120 physically processes the HRP packet 300. More specifically, as shown in FIG. 3, the HRP header 310 includes a PHY control field 360, and one or more sub-packet headers 370-1, 370-2, . . . , and 370-N.

The respective sub-packet headers 370-1, 370-2, . . . , and 370-N include information on the sub-packets 350-1, 350-2, . . . , and 350-N that are included in the packet body 340. In an HRP packet 300, the number of sub-packet headers included in the HRP header 310 is equal to the number of sub-packets included in the packet body 340. In this case, the sub-packet headers correspond to the sub-packets in the order of their arrangement. For example, the first sub-packet header 370-1 includes information on the first sub-packet 350-1, and the second sub-packet header 370-2 includes information on the second sub-packet 350-2. In the same manner, the N-th sub-packet header 370-N includes information on the N-th sub-packet 350-N.

Figure 5:
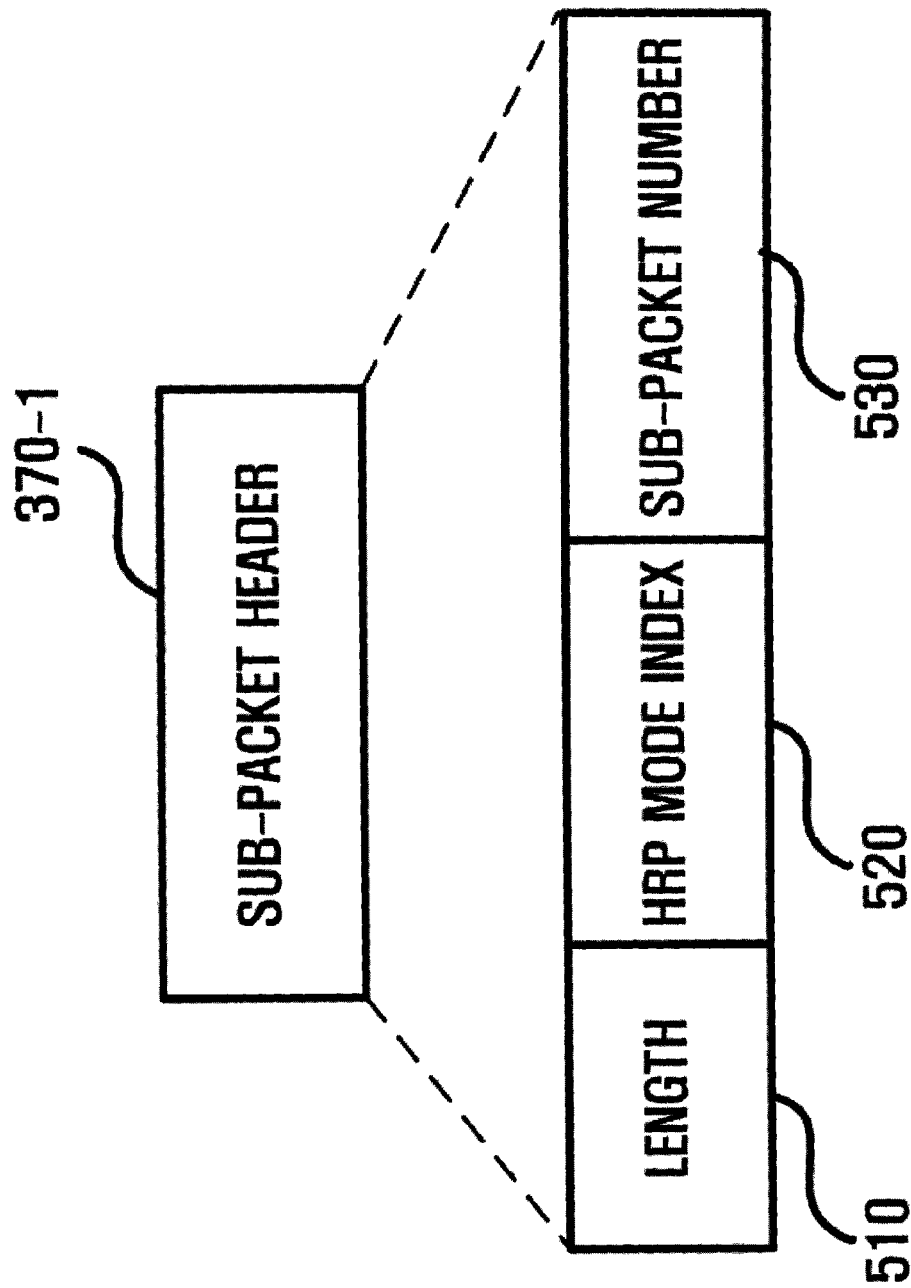
FIG. 5 is a view showing a sub-packet header according to an exemplary embodiment of the present invention.

In one exemplary embodiment of the present invention, the sub-packet header 370-1, as shown in FIG. 5, includes a length field 510, an HRP mode index field 520, and a sub-packet number field 530. The length field 510 indicates the length of the corresponding sub-packet. The HRP mode index field 520 indicates an HRP mode index of the HRP mode applied to the corresponding sub-packet. The sub-packet number field 530 indicates the number of the corresponding sub-packet. The receiving device 120 can confirm the sub-packet number of the respective sub-packet included in the HRP packet 300 using the sub-packet number field 530. Accordingly, if a sub-packet to be retransmitted due to an error occurrence exists, the receiving device 120 transmits the sub-packet number of the corresponding sub-packet to the transmitting device 110. In this case, the transmitting device retransmits the sub-packet that corresponds to the sub-packet number transmitted from the receiving device 120.

In FIG. 5, the reference numeral "370-1" denotes the sub-packet header, and other sub-packet headers 370-2, . . . , and 370-N have a similar construction to that of the sub-packet header 370-1.

Although not specifically illustrated in FIG. 3, the PHY control field 360 may include a beam tracking bit, a UEP mapping bit, a scrambler initialization seed bit, and the like. The beam tracking bit indicates whether the HRP packet 300 includes a beam tracking field. For example, if the HRP packet 300 includes the beam tracking field, the beam tracking bit is set to "1", while if the HRP packet does not include the beam tracking field, the beam tracking bit is set to "0". The UEP mapping bit includes information that identifies whether the UEP mode applied to the sub-packet is a UEP mapping mode or a UEP coding mode. For example, if the UEP mapping mode is applied, the UEP mapping bit is set to "1", while if the UEP coding mode is applied, the UEP mapping bit is set to "0". The scrambler initialization seed bit indicates an initialization seed used when the data to be transmitted is scrambled.

The transmitting device 110 can apply the same HRP mode to all sub-packets included in the HRP packet 300, or apply different HRP modes by sub-packets included in the HRP packet 300. That is, the transmitting device 110 can apply one or more HRP modes to one HRP packet 300. Preferably, the HRP mode including the UEP mode is applied to data composed of bits having different significance levels such as uncompressed video data, and the HRP mode including the EEP mode is applied to data composed of bits having the same significance level such as A/V control data or additional data.

Figure 6:
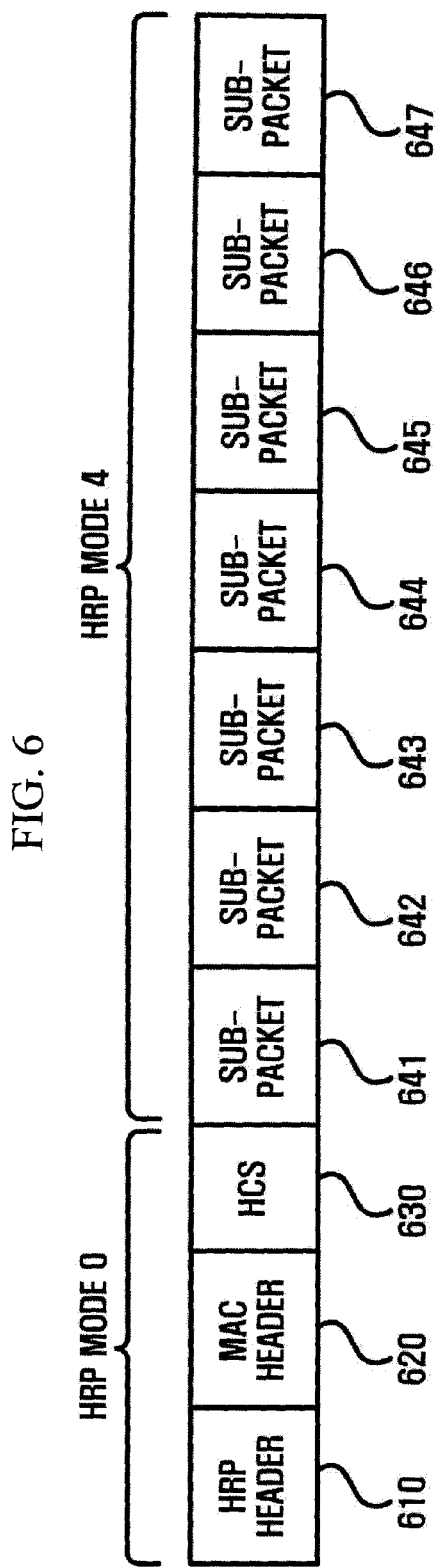
FIG. 6 is an exemplary view explaining an application of high rate physical (PHY) layer (HRP) modes according to an exemplary embodiment of the present invention.
Figure 7:
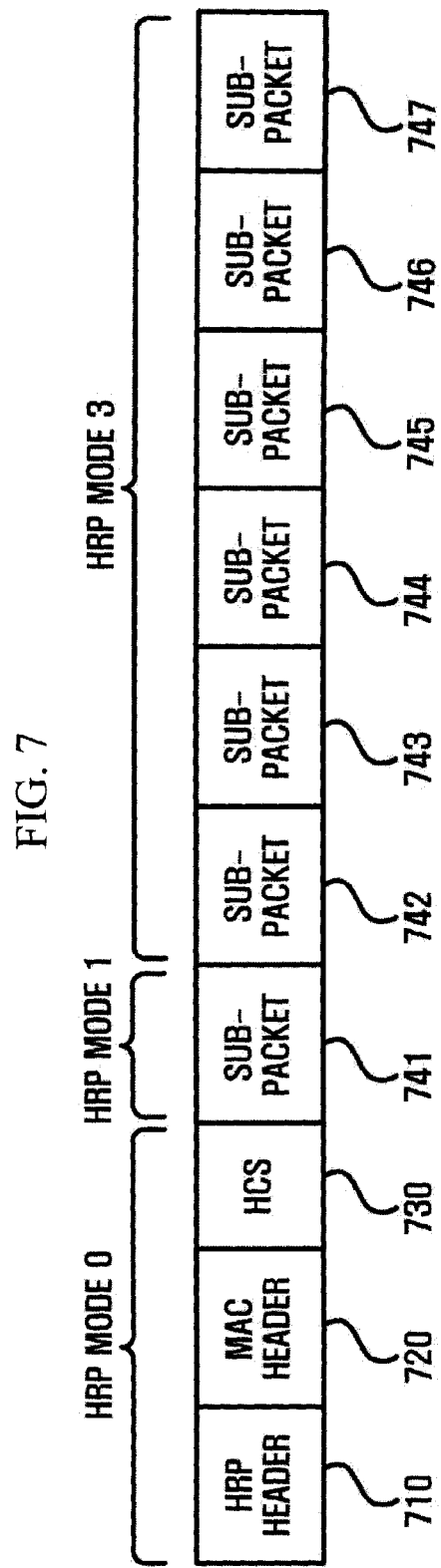
FIG. 7 is an exemplary view explaining an application of HRP modes according to another exemplary embodiment of the present invention.
Figure 8:
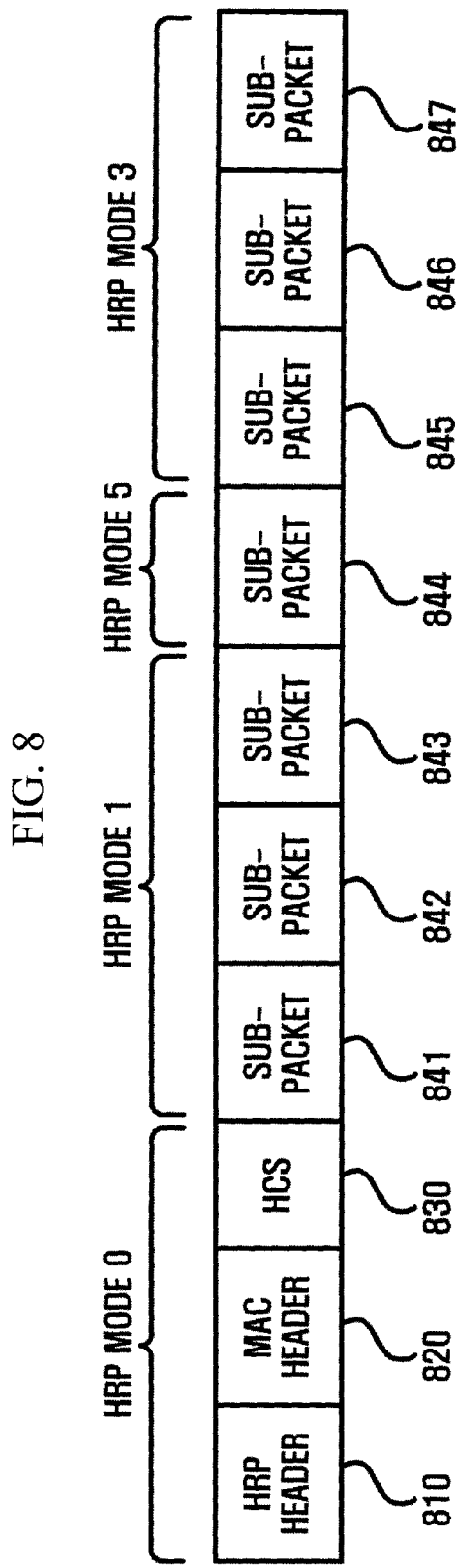
FIG. 8 is an exemplary view explaining an application of HRP modes according to still another exemplary embodiment of the present invention.

FIGS. 6 to 8 are exemplary views explaining application of HRP modes according to exemplary embodiments of the present invention. HRP modes used in FIGS. 6 to 8 are based on the exemplary embodiment as shown in Table 1. In FIGS. 6 to 8, it is exemplified that the HRP packet includes seven sub-packets. However, the number of sub-packets according to the present exemplary embodiment of the invention is not limited thereto.

FIG. 6 shows a case that the same HRP mode is applied to all sub-packets 641 to 647. In FIG. 6, HRP mode 4 is applied to the sub-packets 641 to 647, and thus in consideration of Table 1, a coding work in the UEP mode, in which a coding rate of the upper bit levels is 4/7 and a coding rate of the lower bit levels is 4/5, and a modulation work using 16-QAM can be performed with respect to the sub-packets 641 to 647. In one exemplary embodiment of the present invention, the respective sub-packets 641 to 647 as shown in FIG. 6 include video data.

In the exemplary embodiment of the present invention as shown in FIG. 6, an HRP header 610, a MAC header 620, and an HCS field 630 are processed in HRP mode 0. The HRP header 610, the MAC header 620, and the HCS field 630 may also be processed in other HRP modes. However, it is preferred that the HRP mode including an EEP mode be applied since there is no significant difference among bits composing the HRP header 610, the MAC header 620, and the HCS field 630. The HRP mode to be applied to the HRP header 610, the MAC header 620, and the HCS field 630 may be standardized among devices in the wireless network 100. Accordingly, although the transmitting device 110 has not informed the receiving device 120 of the information about the HRP mode applied to the HRP header 610, the MAC header 620, and the HCS field 630, the receiving device 120 can be aware which HRP mode has been applied to the HRP header 610, the MAC header 620, and the HCS field 630. Hereinafter, explanation of the HRP mode applied to the HRP header 610, the MAC header 620 and the HCS field 630 will be omitted.

In the exemplary embodiment of the present invention as shown in FIG. 7, the first sub-packet 741 is processed in HRP mode 1, and the remaining sub-packets 742 to 747 are processed in HRP mode 3. Accordingly, in consideration of the exemplary embodiment as shown in Table 1, a coding work in the EEP mode, in which a coding rate is 2/3, and a modulation work using QPSK can be performed with respect to the first sub-packet 741. Also, a coding work in the UEP mode, in which a coding rate of the upper bit levels is 4/7 and a coding rate of the lower bit levels is 4/5, and a modulation work using QPSK can be performed with respect to the second to seventh sub-packets 742 to 747. In one exemplary embodiment of the present invention, the first sub-packet 741 includes audio data, and the remaining sub-packets 742 to 747 include video data, as shown in FIG. 7.

In the exemplary embodiment of the present invention as shown in FIG. 8, HRP mode 1 is applied to the first three sub-packets 841, 842, and 843; HRP mode 5 is applied to the fourth sub-packet 844, and HRP mode 3 is applied to the last three sub-packets 845, 846, and 847. Accordingly, in consideration of the exemplary embodiment as shown in Table 1, a coding work in the EEP mode in which a coding rate is 2/3 and a modulation work using QPSK can be performed with respect to the first three sub-packets 841, 842, and 843. Also, a coding work in which a coding rate of the upper bit levels is 1/3 and a modulation work using QPSK can be performed with respect to the fourth sub-packet 844. In addition, a coding work in the UEP mode, in which a coding rate of the upper bit levels is 4/7 and a coding rate of the lower bit levels is 4/5, and a modulation work using QPSK can be performed with respect to the last three sub-packets 845, 846, and 847. In one exemplary embodiment of the present invention, the first three sub-packets 841, 842, and 843 include A/V control data, additional data, and audio data, respectively, and the fourth sub-packet 844 includes video data to be retransmitted. The last three sub-packets 845, 846, and 847 include new video data.

As described above, different HRP modes are applied to the sub-packets according to the data types included in the sub-packets. It is also possible to properly modify the HRP modes according to the wireless environment. The application of HRP modes as shown in FIGS. 6 to 8 is merely exemplary, and thus the exemplary embodiment of the present invention is not limited thereto.

Figure 9:
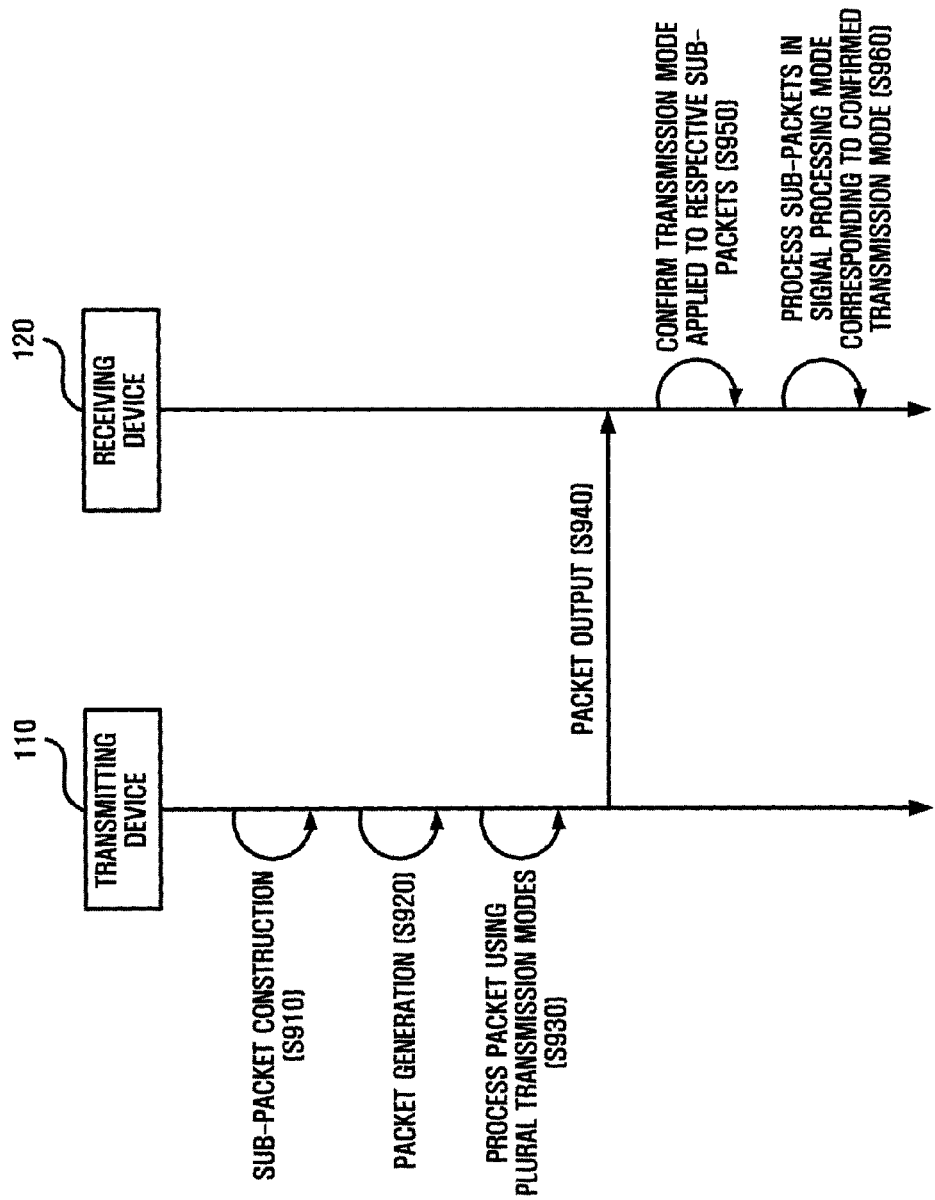
FIG. 9 is a flowchart illustrating a wireless communication process according to an exemplary embodiment of the present invention.

FIG. 9 is a flowchart illustrating a wireless communication process according to an exemplary embodiment of the present invention.

Referring to FIG. 9, the transmitting device 110 constructs data to be transmitted in the form of sub-packets (S910), and generates a packet that includes the sub-packets (S920). A header of the generated packet includes identifiers of transmission modes to be applied to the respective sub-packets. For example, the packet generated at operation S920 may be the HRP packet as described above with reference to FIG. 3.

During the packet generation, the transmitting device 110 performs a grouping of sub-packets having the same transmission mode, and includes the grouped sub-packets in a packet body. That is, the transmitting device 110 arranges the sub-packets which have data of similar types adjacent to each other in the packet body. For example, in the exemplary embodiment of the present invention as shown in FIG. 7, the sub-packets 742 to 747 to which HRP mode 3 is applied are arranged in an adjacent manner, and in the exemplary embodiment of the present invention as shown in FIG. 8, the sub-packets 841, 842, and 843, to which HRP mode 1 is applied, and the sub-packets 845, 846, and 847, to which HRP mode 3 is applied, are adjacently arranged in groups.

Preferably, the transmitting device 110 arranges the sub-packets that include data sensitive to an error, such as audio data and A/V control data, at the head of the packet body. This can be confirmed through the exemplary embodiments as shown in FIGS. 7 and 8.

More specifically, it is assumed that one packet includes five sub-packets. The transmitting device 110 generates a packet including sub-packets 1 to 5. If sub-packets 1, 3, and 5 are normally received in the receiving device 120, but sub-packets 2 and 4 including video data are lost as a result of the transmitting device's transmission of a packet to the receiving device 120, the transmitting device 110 can generate a next packet that includes the lost sub-packets 2 and 4 and new sub-packets 6, 7, and 8. If the sub-packet 6 includes audio data or A/V control data and the sub-packets 7 and 8 include video data, the sub-packets 2, 4, 6, 7, and 8 are arranged in the packet body in a manner that the sub-packet 6 is positioned at the head of the packet body and the sub-packets 2, 4, 7, and 8 including the video data follow the sub-packet 6. In this case, the order of arrangement of the sub-packets including the video data is determined according to the sub-packet numbers. That is, the order of arrangement of the sub-packets 2 and 4 to be retransmitted and the new sub-packets 6, 7, and 8 may be determined in the order of 6→2→4→7→8. This is merely exemplary, and the present invention is not limited thereto.

Since there is no significant difference among the bits composing the audio data, an EEP mode may be applied thereto. In the case of A/V control data, the EEP mode may also be applied. Therefore, if the sub-packets including the audio data or A/V control data are arranged at the head of the packet body, the sub-packets may be processed in the HRP mode, which is the same as the MAC header.

When the packet is generated, the transmitting device 110 processes the packet using a plurality of transmission modes (S930), and wirelessly outputs the processed packet (S940). At operation S940, the transmitting device 110 may perform signal processing operations (e.g., signal coding and signal modulation) by sub-packets.

When the packet is transmitted from the transmitting device 110, the receiving device 120 can confirm the transmission modes applied to the respective sub-packets through the header of the packet (S950). Then, the receiving device 120 processes the sub-packets using signal processing modes that correspond to the confirmed transmission modes (S960). As a result of processing the sub-packets, the receiving device 120 can acquire the data included in the respective sub-packets.

If the transmitting device 110 has applied plural transmission modes to one packet, the receiving device 120 can process the received packet in plural signal processing modes. Here, the signal processing mode corresponds to the transmission mode of the transmitting device 110. For example, if the transmitting device 110 has processed the packet using the coding mode and the modulation method in the exemplary embodiment of the present invention as shown in Table 1, the receiving device 120 can use the corresponding decoding mode and demodulation method.

Figure 10:
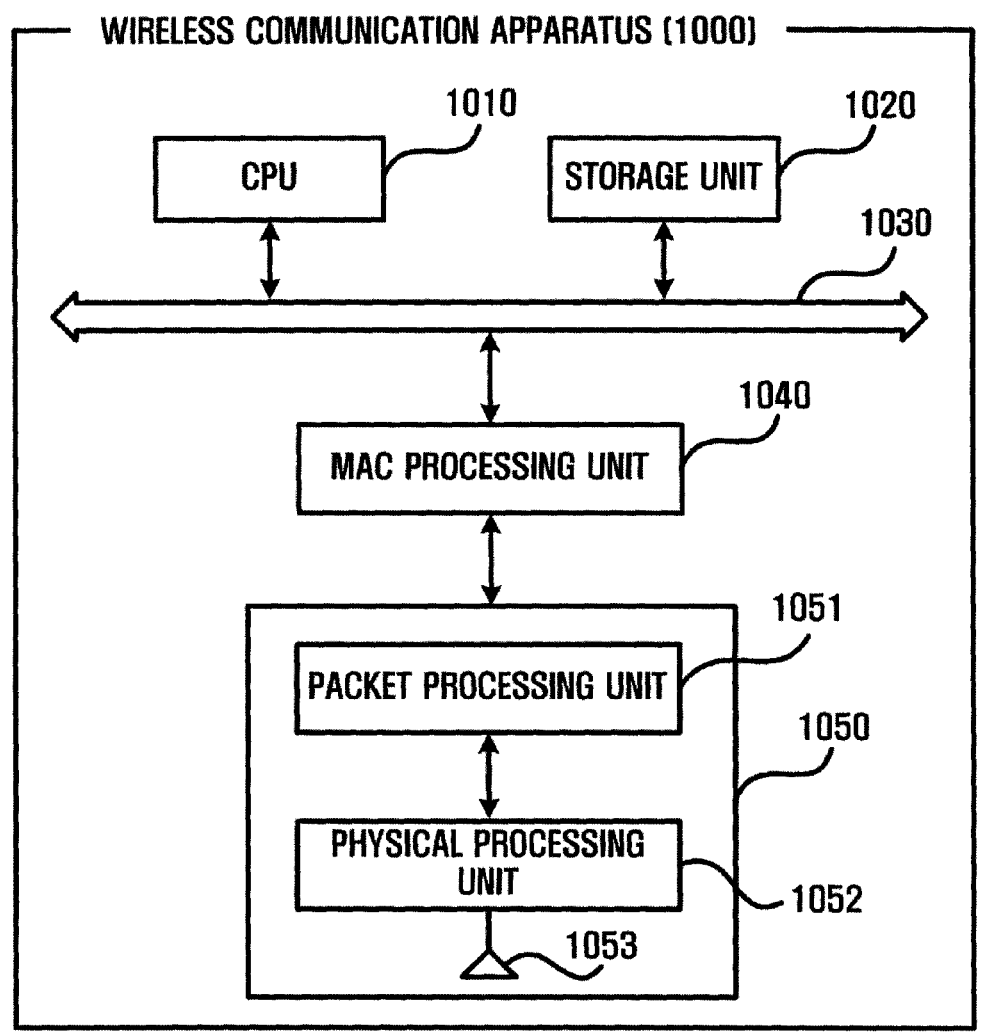
FIG. 10 is a block diagram illustrating an apparatus for wireless communications according to an exemplary embodiment of the present invention.

FIG. 10 is a block diagram illustrating an apparatus 1000 for wireless communications according to an exemplary embodiment of the present invention.

The wireless communication apparatus 1000 as shown in FIG. 10 may be the transmitting device 120 or the receiving device 120 as described above. The wireless communication apparatus 1000 includes a CPU 1010, a storage unit 1020, an MAC processing unit 1040, and a transmitting/receiving unit 1050.

The CPU 1010 controls other components connected to a bus 1030, and serves to process data on upper layers (e.g., a logical link control (LLC) layer, a network layer, a transmission layer, an application layer, and the like) of the MAC layer among general communication layers. Accordingly, the CPU 1010 processes received data provided from the MAC processing unit 1040, or generates transmitted data and provides the generated data to the MAC processing unit 1040. For example, the data generated or processed by the CPU 1010 may be uncompressed A/V data.

The storage unit 1020 stores the received data processed by the CPU 1010, or stores the transmitted data generated by the CPU 1010. The storage unit 1020 may be implemented by a nonvolatile memory device such as a ROM, a PROM, an EPROM, and a flash memory, a volatile memory device such as a RAM, a storage medium such as a hard disc and an optical disc, or another memory known in the related art.

The MAC processing unit 1040 generates sub-packets using data provided from the CPU 1010, and transfers the generated sub-packets to the transmitting/receiving unit 1050. If the CPU 1010 provides the sub-packets, the MAC processing unit 1040 may transfer the sub-packets to the transmitting/receiving unit 1050. The MAC processing unit 1040 can determine the order of arrangement of the sub-packets so that the sub-packets including data of similar types are adjacently arranged in the packet body.

In addition, the MAC processing unit 1040 transfers data included in the sub-packets provided from the transmitting/receiving unit 1050 to the CPU 1010. If plural sub-packets are provided, the MAC processing unit 1040 may combine data pieces included in the respective sub-packets into one data.

The transmitting/receiving unit 1050 transmits the packet including the sub-packets provided from the MAC processing unit 1040 to another wireless communication apparatus. Additionally, the transmitting/receiving unit 1050 receives a packet transmitted from another wireless communication apparatus, and transfers the sub-packets included in the received packet to the MAC processing unit 1040. More specifically, the transmitting/receiving unit includes a packet processing unit 1051 and a physical processing unit 1052.

The packet processing unit 1051 generates a packet including the sub-packets provided from the MAC processing unit 1040. The packet generated by the packet processing unit 1051 may be the HRP packet as described above with reference to FIG. 3. That is, the packet processing unit 1051 determines the transmission mode (e.g., one among HRP modes as shown in Table 1) to be applied to the sub-packets according to the type of data included in the sub-packet, and sets the identifier of the determined transmission mode in the header of the packet. Also, the packet processing unit 1051 informs the physical processing unit 1052 of the transmission mode to be applied to the sub-packets.

In addition, the packet processing unit 1051 confirms the transmission mode applied to the sub-packets included in the packet by analyzing the header of the received packet transmitted from another wireless communication apparatus. Through this, the packet processing unit 1051 informs the physical processing unit 1052 what signal processing mode should be applied to the respective sub-packets. Also, the packet processing unit 1051 extracts the sub-packets from the received packet, and transfers the extracted sub-packets to the MAC processing unit 1040.

The physical processing unit 1052 performs a signal processing operation for transmitting the packet being transferred from the packet processing unit 1051, and wirelessly outputs the processed packet using an antenna 1053. The signal processing operation is performed for the header of the packet and the respective sub-packets. The signal processing operation includes signal coding and signal modulation operations. The physical processing unit 1052 processes the header of the packet and the respective sub-packets in a coding mode and modulation method under the control of the packet processing unit 1051. Even without the control of the packet processing unit 1051, the physical processing unit 1052 may process the header of the packet using the coding mode and modulation method previously set by default.

In addition, the physical processing unit 1052 receives a packet transmitted from another wireless communication apparatus through the antenna 1053, and performs a signal processing of the received packet. The signal processing operation includes signal demodulation and signal decoding operations. The particular demodulation method and decoding mode the physical processing unit 1052 uses may be determined under the control of the packet processing unit 1051. Even without the control of the packet processing unit 1051, the physical processing unit 1052 may process the header of the packet using the demodulating method and decoding mode previously set by default. The physical processing unit 1052 may be implemented by the HRP. Although not illustrated in the drawing, the wireless communication apparatus 1000 may include another physical processing unit implemented by the LRP.

The components of the wireless communication apparatus 1000 as described above with reference to FIG. 10 can be implemented by modules. The term "module", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for wireless communications, the method comprising:

generating a packet that comprises a plurality of sub-packets; and outputting the packet using a plurality of transmission modes, wherein the outputting the packet comprises:

processing the plurality of sub-packets in any one of the plurality of transmission modes; and transmitting the packet including the processed sub-packets to a receiving device, and wherein the transmission modes are high rate physical layers (HRP) mode which support different processing methods, and the packet comprises a packet body and a packet header, the packet body comprises the plurality of sub-packets, and the packet header comprises a plurality of sub-packet headers having information on the respective sub-packets.

2. The method of claim 1, wherein at least one of a coding mode, a modulation method, and a transmission rate differs among the plurality of transmission modes, and the coding mode includes an equal error protection mode in which a same coding rate is applied to all bits of data, and an unequal error protection mode in which at least two coding rates are applied to different bits of the data.

3. The method of claim 1, wherein each of the plurality of sub-packet headers comprises at least one of a length of a corresponding sub-packet, an identifier of the transmission mode to be applied to the corresponding sub-packet, and a sub-packet number of the corresponding sub-packet.

4. The method of claim 1, wherein the plurality of sub-packets are grouped by sub-packets to which a same transmission mode is applied, and are included in the packet, and each of the plurality of sub-packets comprises at least one of video data, audio data, audio or video control data, and additional data.

5. The method of claim 1, wherein the plurality of sub-packets comprises a first sub-packet comprising audio data or audio or video control data and a second sub-packet comprising video data, and an order of arrangement of the first sub-packet precedes an order of arrangement of the second sub-packet in the generated packet.

6. An apparatus for wireless communications, the apparatus comprising:

a media access control processing unit which generates a plurality of sub-packets; and a transmitting unit which outputs a packet that comprises the plurality of sub-packets using a plurality of transmission modes, wherein the outputting the packet comprises:

processing the plurality of sub-packets in any one of the plurality of transmission modes; and transmitting the packet including the processed sub-packets to a receiving device, and wherein the transmission modes are high rate physical layers (HRP) modes which support different processing methods, and packet comprises a packet body and a packet header, the packet body comprises the plurality of sub-packets, and the packet header comprises a plurality of sub-packet headers having information on the respective sub-packets.

7. The apparatus of claim 6, wherein at least one of a coding mode, a modulation method, and a transmission rate differs among the plurality of transmission modes, and the coding mode includes an equal error protection mode in which a same coding rate is applied to all bits of data, and an unequal error protection mode in which two or more coding rates are applied to different bits of the data.

8. The apparatus of claim 6, wherein each of the plurality of sub-packet headers comprises at least one of a length of a corresponding sub-packet, an identifier of the transmission mode to be applied to the corresponding sub-packet, and a sub-packet number of the corresponding sub-packet.

9. The apparatus of claim 6, wherein the plurality of sub-packets are grouped by sub-packets to which the same transmission mode is applied, and are included in the packet.

10. The apparatus of claim 6, wherein each of the plurality of sub-packets comprises at least one of video data, audio data, audio or video control data, and additional data.

11. The apparatus of claim 6, wherein the plurality of sub-packets comprise a first sub-packet comprising audio data or audio or video control data and a second sub-packet comprising video data, and an order of arrangement of the first sub-packet precedes an order of arrangement of the second sub-packet in the generated packet.

* * * * *